United States Patent
Hirata et al.

(10) Patent No.: US 7,631,181 B2
(45) Date of Patent: Dec. 8, 2009

(54) COMMUNICATION APPARATUS AND METHOD, AND PROGRAM FOR APPLYING SECURITY POLICY

(75) Inventors: Takashi Hirata, Kanagawa (JP); Kenichi Fujii, Kanagawa (JP); Masaki Shitano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 10/926,438

(22) Filed: Aug. 26, 2004

(65) Prior Publication Data

US 2005/0066197 A1 Mar. 24, 2005

(30) Foreign Application Priority Data

Sep. 22, 2003 (JP) .............................. 2003-330059
Sep. 22, 2003 (JP) .............................. 2003-330060

(51) Int. Cl.
*H04L 9/00* (2006.01)
(52) U.S. Cl. .......................................... 713/151; 726/1
(58) Field of Classification Search ................ 713/151, 713/1; 726/1, 15; 709/230
See application file for complete search history.

(56) References Cited

U.S. PATENT DOCUMENTS

| | | | |
|---|---|---|---|
| 6,401,204 B1 * | 6/2002 | Euchner et al. ............. | 713/169 |
| 6,578,076 B1 * | 6/2003 | Putzolu ....................... | 709/223 |
| 6,924,727 B2 | 8/2005 | Nagaoka et al. ............. | 340/3.1 |
| 7,206,307 B1 * | 4/2007 | Kittredge et al. ............ | 370/352 |
| 2001/0042201 A1 * | 11/2001 | Yamaguchi et al. ......... | 713/151 |
| 2002/0087699 A1 * | 7/2002 | Karagiannis et al. ........ | 709/227 |
| 2003/0046583 A1 * | 3/2003 | Goldman et al. ............ | 713/201 |
| 2007/0286166 A1 * | 12/2007 | Kittredge et al. ............ | 370/352 |

FOREIGN PATENT DOCUMENTS

JP 2001-298449 10/2001

OTHER PUBLICATIONS

Osamu Nakagawa et al., "The Most Promising Approach for Secure Communication—Ideal and Reality of IPsec-," Nikkei Byte, Nikkei Business Publications, Inc., Aug. 2002, pp. 78-93.

* cited by examiner

*Primary Examiner*—Jung Kim
*Assistant Examiner*—Samson B Lemma
(74) *Attorney, Agent, or Firm*—Fitzpatrick, Cella, Harper & Scinto

(57) ABSTRACT

Corresponding respective security policies are applied to a discovery protocol (a protocol used in the discovery phase) and a control protocol (a protocol used in the control phase) of a device control protocol when communications are made.

16 Claims, 15 Drawing Sheets

FIG. 10

| Address | Application |
|---|---|
| 2001:340:a | Browser |
| 2001:340:2 | E |
| 2001:340:::ff00:1 | |
| 2001:340:43:10 | DNS |
| 2001:340:2:2:1 | |
| 2001:340:b:1:3 | |
| | |
| | |

ADDRESS MANAGER

FIG. 11

| Level | Parameter |
|---|---|
| 1 | AH:IN |
| 2 | ESP:IN |
| 3 | AH:ESP:IN |
| 4 | AH:INOUT |
| 5 | ESP:INOUT |
| 6 | AH:ESP:INOUT |

SECURITY POLICY MANAGER

FIG. 12

| Application | Level |
|---|---|
| Browser | 6 |
| Mail | 6 |
| DNS | 1 |
| Chat | 2 |
| P2P | 3 |

APPLICATION MANAGER

FLOWCHART OF SYSTEM PROCESS

FLOWCHART OF SYSTEM PROCESS

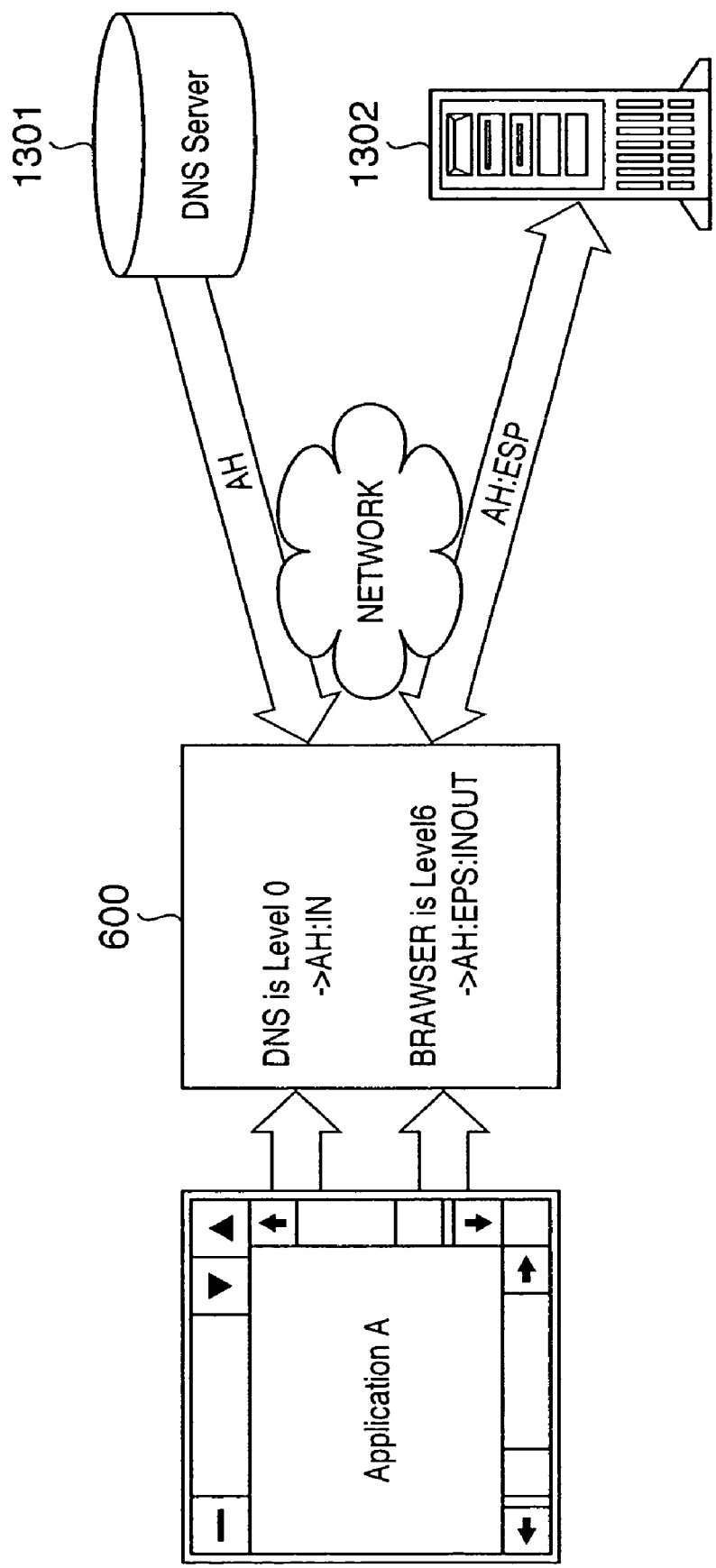

COMMUNICATION APPARATUS AND METHOD, AND PROGRAM FOR APPLYING SECURITY POLICY

FIELD OF THE INVENTION

The present invention relates to a communication apparatus and method, and a program for applying a security policy.

BACKGROUND OF THE INVENTION

Along with the advance of the digital computer technology, even in office devices and general home appliances, functions such as connection, cooperation of processes, and the like can be implemented via a network.

As network techniques that implement fusion of such device control apparatuses via networks, device control protocols such as UPnP (Universal Plug and Play), Jini, Jxta, and the like are known.

UPnP will be explained below as an example. UPnP is a device control protocol that supports protocols such as IP (Internet Protocol), TCP (Transfer Control Protocol), UDP (User Datagram Protocol), HTTP (Hyper Text Transfer Protocol, XML (extensible Markup Language), and the like, which have become de facto standards in the Internet world.

UPnP uses SSDP to discover devices connected on the network and to recognize their functions. SSDP is a backbone of UPnP, and its standard specification is issued by IETF. In order to discover devices, IP broadcast is used. For example, when a query "which device can play back a digital video stream?" is broadcast, devices which meet the condition voluntarily transmit their IP addresses and host names to the query source. At this time, information unique to each device (e.g., functions that these devices have) is exchanged. The data format used in information exchange is XML, and communications are made by HTTP.

Device control uses SOAP (Simple Object Access Protocol). SOAP is an RPC-based Internet communication industry standard protocol, which is arranged to smoothly exchange XML Web services. A control message is transmitted to a device using SOAP, and a result or error is acquired. A UPnP control request is a SOAP message including an action that calls by designating parameters. Also, a response is a SOAP message including status, and a value and parameters are returned.

A device control protocol represented by UPnP, which is used to connect devices each other via a network, roughly includes a discovery phase that searches devices connected to the network, and a control phase that controls devices discovered in the discovery phase. In many cases, these phases adopt different communication schemes: broadcast communications are made in the discovery phase, and unicast communications are made in the control phase.

As for a security policy, a method of dynamically determining a security policy at the beginning of a communication with a control device (each system has one security policy), and a method of dynamically determining a security policy by authenticating a user who uses a control device (each user has one security policy) (see US2001/0042201) are available.

With the popularization of the Internet, e-commerce, online shopping, and the like have prevailed.

However, since such transactions are made without any direct face-to-face exchange, crimes such as "sniffing", "falsification of data", "spoofing by a third party", and the like peculiar to the Internet have occurred frequently.

Hence, how to maintain and assure security in data transmission/reception, e-commerce, and the like poses serious problems.

Various methods of assuring security in network communications such as SSL (Secure Socket Layer; to be abbreviated as "SSL" hereinafter), TLS (Transport Layer Security; to be abbreviated as "TLS" hereinafter), IPSec (Internet Protocol Security; to be abbreviated as "IPSec" hereinafter), and the like are available. IPSec is described in RFC 2402 and RFC 2406.

SSL implements encrypted communications that protect communications among a Web server, browser, and portable terminal. SSL is mainly used in communications between specific applications. Likewise, TLS is used in communications between two applications.

On the other hand, since IPSec assures security on the IP level, it goes into effect in all network communications of applications which run on that system.

However, with the aforementioned prior art systems, SSL is used in an Internet browser or the like and is installed in a specific application, but it is not operative for other network communications of a system that uses them.

For example, when the user is browsing external resources using SSL on a Web browser, if he or she wants to transmit/receive e-mail messages using mailing software on that system, no security is assured.

SUMMARY OF THE INVENTION

It is an object of the present invention to improve security in such environments.

It is another object of the present invention to attain appropriate, flexible access control.

In one aspect of the present invention, a communication with a device is executed in accordance with a predetermined protocol, and a security policy corresponding to a phase of the communication is applied to the communication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a conceptual view of an address manager;

FIG. 11 is a conceptual view of a security policy manager;

FIG. 12 is a conceptual view of an application manager;

FIG. 15 is a schematic view of a system according to the fifth embodiment of the present invention.

DETAILED DESCRIPTION OF THE PREFERRED EMBODIMENTS

Preferred embodiments of the present invention will now be described in detail in accordance with the accompanying drawings.

Figure 1:
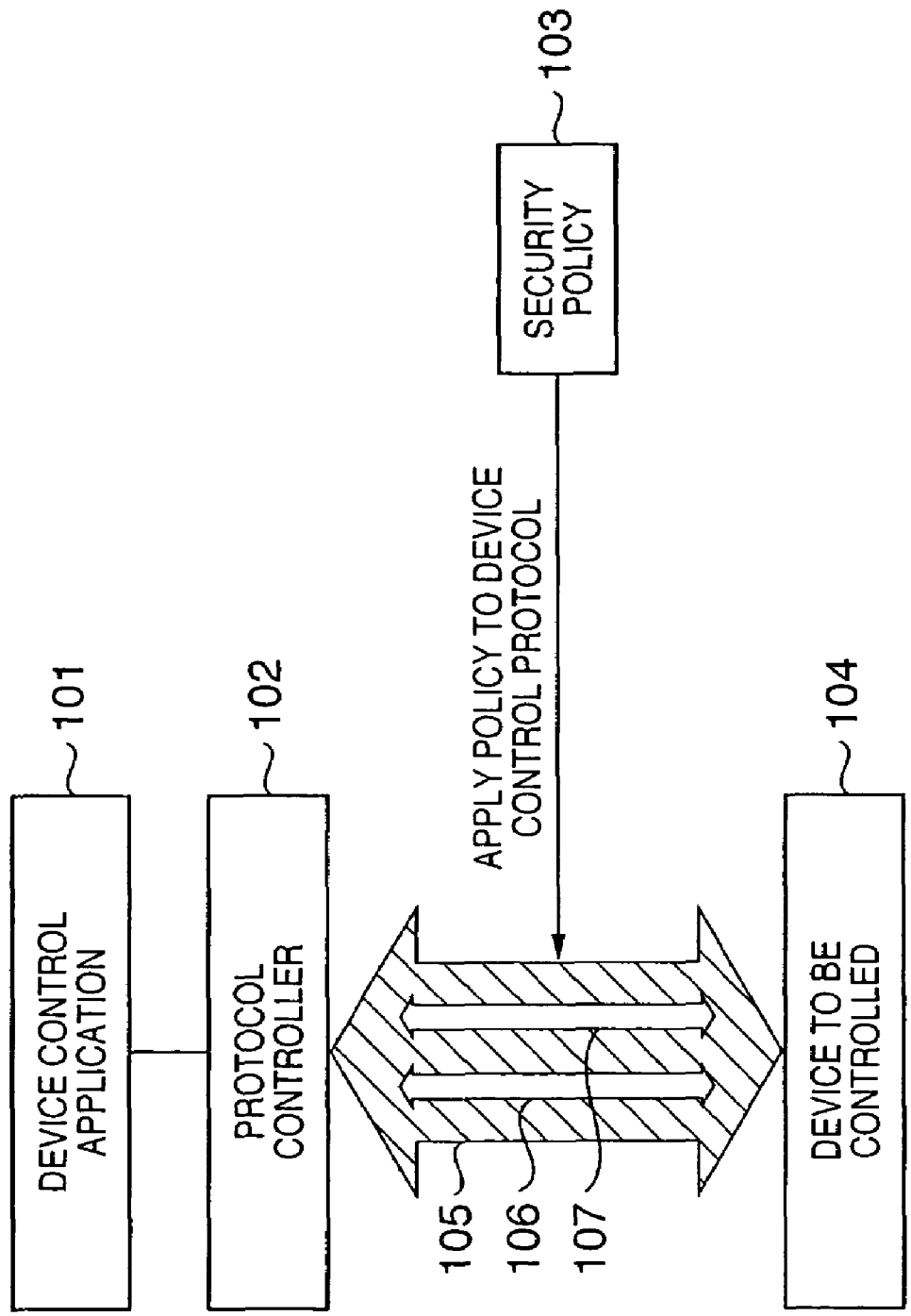
FIG. 1 is a diagram showing the arrangement of a device control apparatus according to a prior art.
Figure 2:
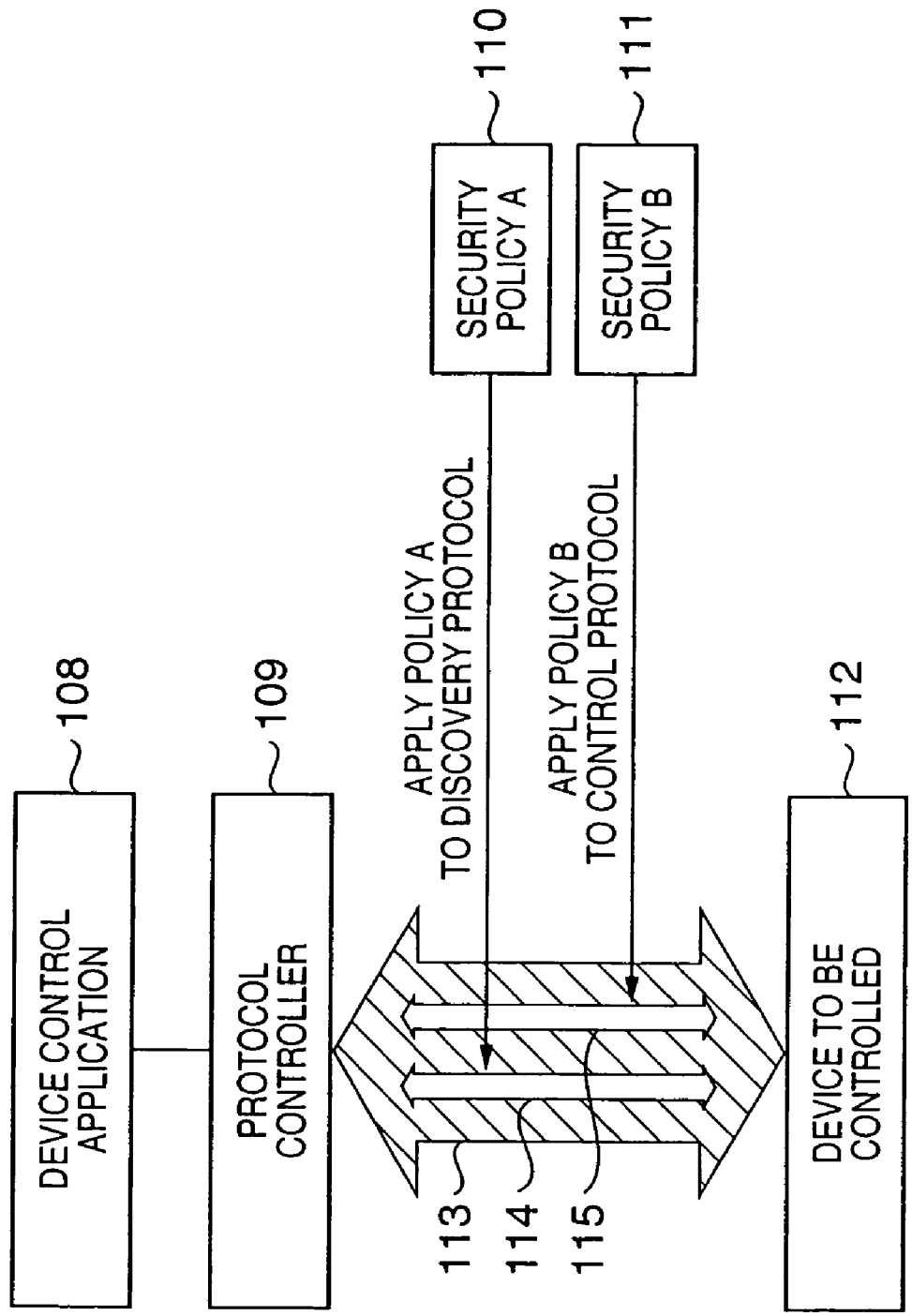
FIG. 2 is a diagram showing the arrangement of a device control apparatus according to the first embodiment of the present invention.

FIGS. 1 and 2 are diagrams showing differences between the present invention and prior art.

In the prior art shown in FIG. 1, when a security policy 103 is applied to a device control protocol 105 used in a communication between a protocol controller 102 and device 104 to be controlled, one security policy is applied to the entire device control protocol 105 without distinguishing a discovery protocol 106 and control protocol 107.

By contrast, a device control apparatus (communication apparatus) according to the first embodiment shown in FIG. 2 has a device control application 108, protocol controller 109, and security policies 110 and 111. The apparatus applies the security policy A 110 to a discovery protocol as a protocol used in a discovery phase of a device control protocol 113, and the security policy B 111 to a control protocol 115 as a protocol used in a control phase in place of applying the security policy to the device control protocol 113 used in a communication between the protocol controller 109 and a device 112 to be controlled.

In this manner, the device control apparatus holds a plurality of security policies 110 and 111, and applies suitable security policies 110 and 111 to the protocol 114 used in the discovery phase in the device control protocol 113 and the protocol 115 used in the control phase. For example, in case of UPnP as a device control protocol, suitable security policies can be respectively applied to protocol SSDP used in the discovery phase and protocol SOAP used in the control phase.

As described above, according to the embodiment of the present invention, the security policies 110 and 111 suited to the discovery and control phases of the device control protocol are set. For example, the security policy applied to the discovery phase can select devices to be discovered (only devices with matched security policies are discovered). Furthermore, the security policy applied to the control phase can further select devices (only devices with matched security policies can be controlled). Hence, more secure device control can be implemented.

By applying various security policies in the discovery phase, device control apparatuses with matched security policies can discover each other, and a group based on the security policy of the discovery phase can be formed in the device control apparatus network.

Figure 3:
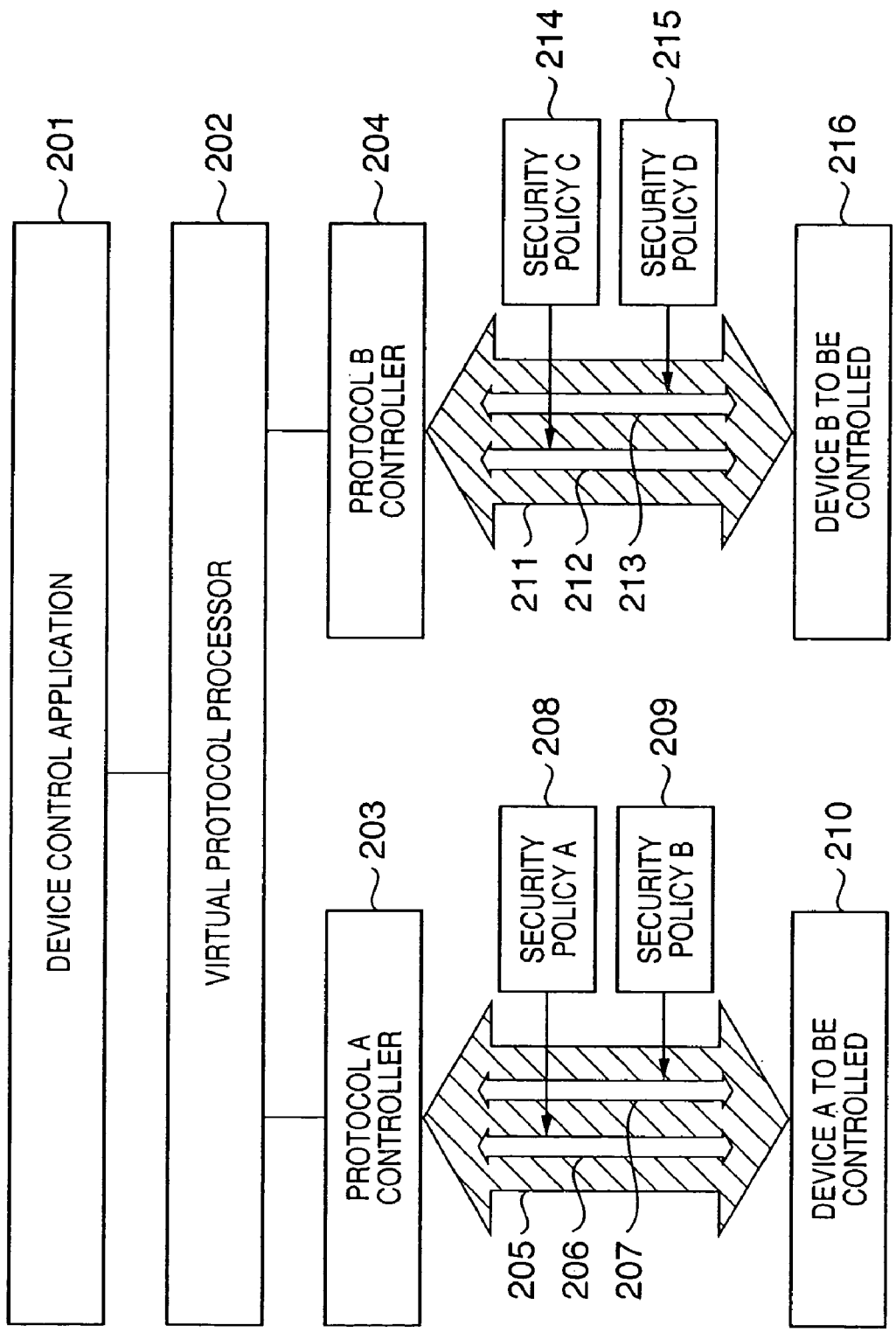
FIG. 3 is a diagram showing the arrangement of a device control apparatus which can support a plurality of device control protocols, according to the second embodiment of the present invention.

The second embodiment of the present invention shown in FIG. 3 is an embodiment of a device control apparatus (communication apparatus) which is configured to be able to support a plurality of device control protocols.

A device control application 201 executes processes unique to actual device control protocols to connect devices 210 and 216 to be controlled by protocol controllers 203 and 204 that control a plurality of device control protocols via a virtual protocol processor 202, i.e., a virtual protocol which provides means that generalizes functions required for device control.

When the device control application 201 issues an arbitrary command (a command used in the virtual protocol), the virtual protocol processor 202 converts the command issued by the device control application 201 into a command used in a device control protocol A 205 (and/or a device control protocol B 211), and supplies the converted command to the protocol A controller 203 (and/or the protocol controller 204). Upon searching for or controlling devices using both the device control protocols A 205 and B 211, the virtual protocol processor 202 supplies a discovery or control command to both the protocol A controller 203 and protocol B controller 204. Upon searching for or controlling devices using one of the device control protocols A 205 and B 211, the virtual protocol processor 202 supplies a discovery or control command to one of the protocol A controller 203 and protocol B controller 204.

In FIG. 3, two different protocols, i.e., protocols A and B are supported. However, the number of protocols to be supported simultaneously is not particularly limited.

In a device control apparatus which can support a plurality of device control protocols like in FIG. 3, different security levels are applied depending on not only the phases of each device control protocol but also the device control protocols. Hence, in the embodiment shown in FIG. 3, a security policy A 208 is applied to a discovery protocol A 206 as a protocol used in the discovery phase of the device control protocol A 205 which is used in a communication between the protocol A controller 203 and device A 210 to be controlled, and a security policy B 209 is applied to a control protocol A 207 as a protocol used in the control phase. Also, a security policy C 214 is applied to a discovery protocol B 212 as a protocol used in the discovery phase of the device control protocol B 211 which is used in a communication between the protocol B controller 204 and device B 216 to be controlled, and a security policy D 215 is applied to a control protocol B 213 as a protocol used in the control phase.

In this manner, the device control apparatus which can support a plurality of device control protocols holds a plurality of security policies, and can apply suited security policies to a protocol used in the discovery phase and a protocol used in the control phase of each device control protocol supported by the device control apparatus.

For example, when the device control protocol A 205 used by the protocol A controller 203 is UPnP, and the device control protocol B 211 used by the protocol B controller 204 is a protocol (that searches devices by UDDI and controls devices by SOAP) based on Web service, suited security policies 208 and 209 can be respectively applied to protocol SSDP (A 206) used in the discovery phase and protocol SOAP (A 207) used in the control phase of UPnP as the device control protocol A 205. Furthermore, suited security policies 214 and 215 can be respectively applied to a search request (B 212) to UDDI by SOAP used in the discovery phase and control (B 213) by SOAP used in the control phase of the device control protocol B 211.

That is, in this embodiment, different security policies are applied depending on whether a device search is conducted via broadcast communications like SSDP in UPnP or a device search is conducted using a database that provides a directory service like a search request to UDDI by SOAP.

As described above, in this embodiment, in the device control apparatus which is configured to be able to support a plurality of device control protocols, security policies suited to the discovery and control phases of each device control protocol supported by the device control apparatus are set. For example, a security policy which is applied to the discovery phase of each device control protocol selects devices to be discovered (only devices with matched security policies are discovered). Furthermore, a security policy applied to the control phase can further select devices (only devices with matched security policies can be controlled). Hence, more secure device control can be implemented. By applying various security policies in the discovery phase of each device control protocol, device control apparatuses with matched security policies can discover each other, and a group based on the security policy of the discovery phase can be formed in the device control apparatus network.

Figure 4:
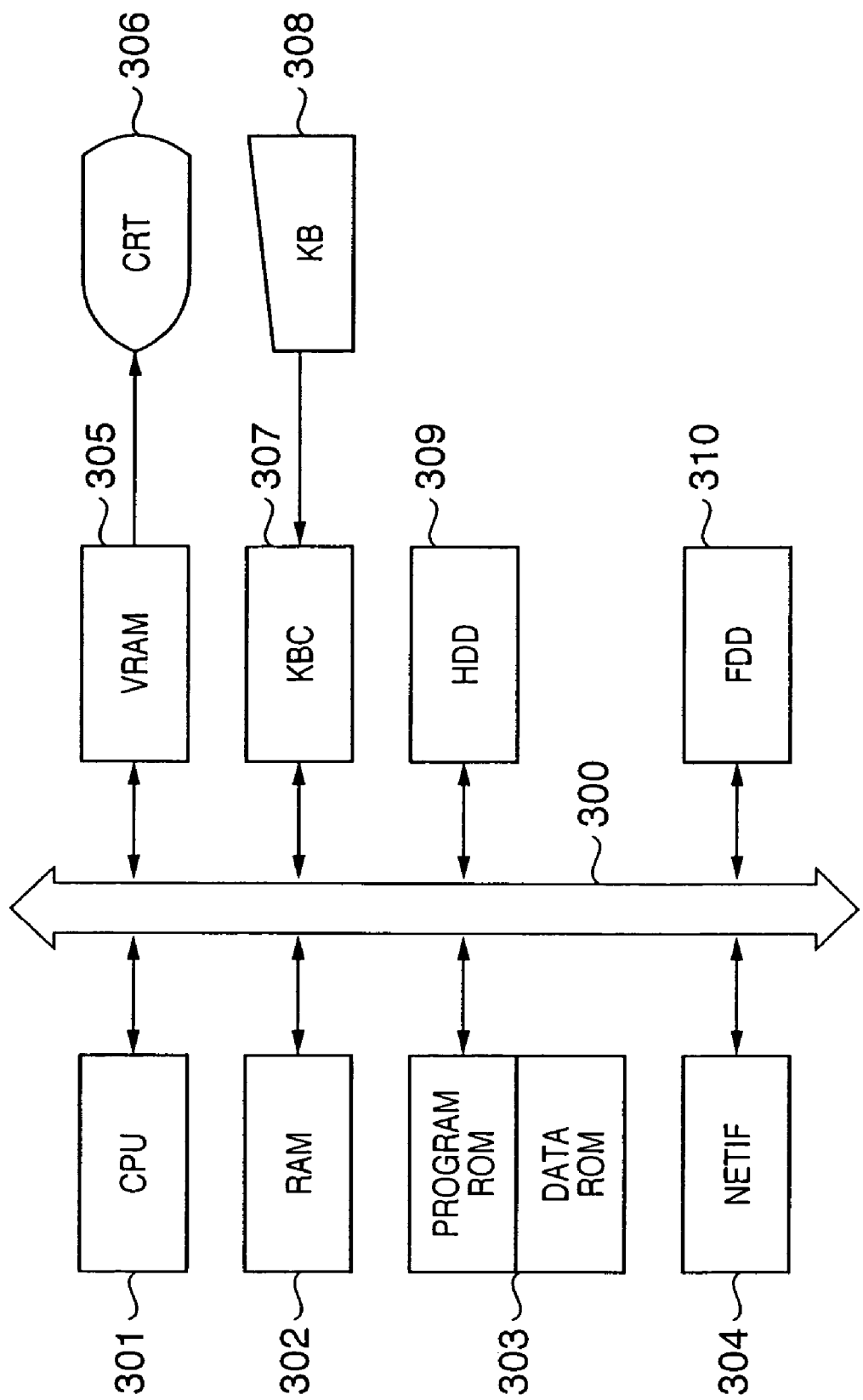
FIG. 4 is a system block diagram of a device control apparatus according to the present invention, which is implemented using a PC (personal computer)

FIG. 4 is a block diagram of the device control apparatus (communication apparatus) according to the present invention, which is implemented using a computer system such as a PC (personal computer) or the like.

Note that the device control apparatus (communication apparatus) can also be implemented by a workstation, a notebook PC, a palmtop PC, various home appliances such as a television that incorporates a computer, and the like, a game machine having a communication function, and terminals such as a telephone, FAX, portable phone, PHS, PDA, and the like, which have a communication function required to communicate with other device control apparatuses, or combinations of them.

Referring to FIG. 4, reference numeral 301 denotes a central processing unit (to be abbreviated as a CPU hereinafter) which controls the computer system.

Reference numeral 302 denotes a random access memory (to be abbreviated as a RAM hereinafter), which serves as a main memory of the CPU 301, and an area for a running program and an execution area and data area of that program.

Reference numeral 303 denotes a read-only memory (to be abbreviated as a ROM hereinafter) which records the operation processing sequence of the CPU 301. The ROM 303 includes a program ROM which records basic software (OS) as a system program required to execute device control of the computer system, and a data ROM that records information and the like required to operate the system. In some cases, an HDD 309 (to be described later) may be used in place of the ROM 303.

Reference numeral 304 denotes a network interface (to be abbreviated as a NETIF hereinafter), which makes control for data transfer between computer systems via a network, and diagnoses the connection status. The NETIF 304 serves as communication means which communicates with other devices in accordance with a predetermined protocol, and as access means used to access external resources. The CPU 301 applies a security policy corresponding to a communication phase by the NETIF 304 as the communication means. This security policy is stored in the RAM 302 or HDD 309. The CPU 301 as application means applies security policies corresponding to a discovery phase that discovers devices, and a control phase that controls discovered devices, as will be described later.

Reference numeral 305 denotes a video RAM (to be abbreviated as a VRAM hereinafter), which is used to map an image to be displayed on the screen of a CRT 306 that displays the operating state of the computer system, and to control display. Reference numeral 306 denotes a display device (e.g., a display). The display device 306 will be referred to as a CRT hereinafter.

Reference numeral 307 denotes a controller which controls an input signal from an external input device 308 to be described below. Reference numeral 308 denotes an external input device which accepts an operation which is made by the user of the computer system with respect to the computer system. The external input device 308 includes, e.g., a keyboard and the like.

Reference numeral 309 denotes a storage device such as a hard disk or the like. The storage device 309 is used to save application programs, and data such as image information and the like. The application programs in this embodiment include software programs that implement various device control means which form this embodiment, and the like.

Reference numeral 310 denotes an external input/output device such as a floppy disk drive, CD-ROM drive, or the like, which is used to read out the application programs from a medium. The external input/output device 310 will be referred to as an FDD hereinafter. Note that the application programs and data stored in the HDD 309 can be stored in the FDD 310 when they are used.

Reference numeral 300 denotes an input/output bus (address bus, data bus, and control bus) which is used to interconnect the aforementioned units.

Application modules of the device control apparatus (communication apparatus) according to the third embodiment of the present invention will be described below using FIG. 5.

Note that application modules to be described below are implemented by supplying a recording or storage medium that records a program code of software which implements the functions to a system or apparatus, and reading out and executing the program code stored in the storage medium by a computer (CPU or MPU) of the system or apparatus. In this case, the program code itself read out from the recording medium implements the functions of the aforementioned embodiments (or embodiments to be described later), and the storage medium that records the program code constitutes the present invention.

The functions of the aforementioned embodiments (or embodiments to be described later) may be implemented not only by executing the readout program code by the computer but also by some or all of actual processing operations executed by an OS (operating system) running on the computer on the basis of an instruction of the program code. Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Figure 5:
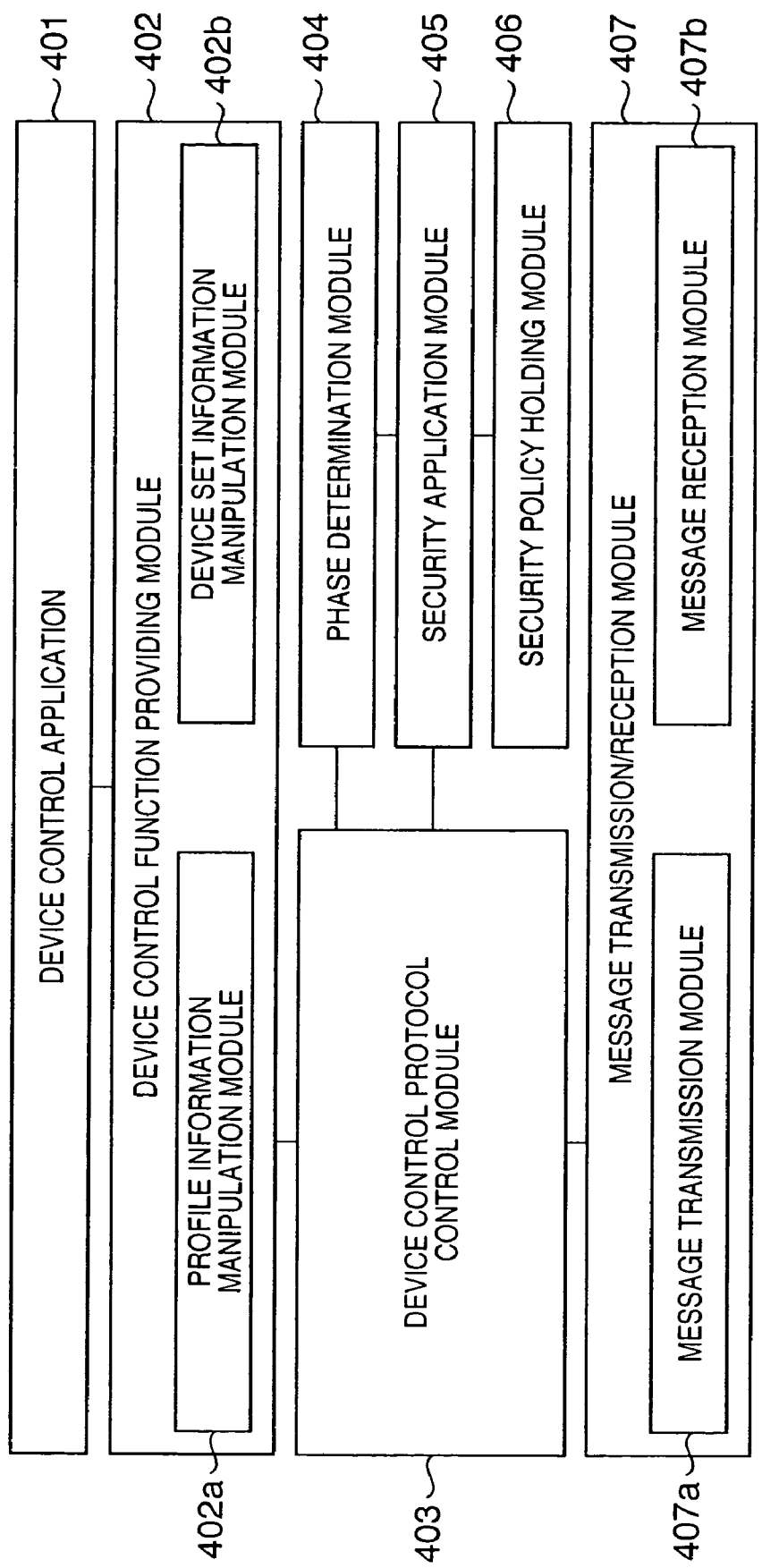
FIG. 5 is a diagram showing the module configuration of a device control apparatus according to the third embodiment of the present invention.

The description will revert to FIG. 5. The device control apparatus (communication apparatus) has a device control application 401, device control function providing module 402, device control protocol control module 403, phase determination module 404, security application module 405, security policy holding module 406, and message transmission/reception module 407.

The device control application 401 controls data inputs/outputs among the external input device 308, display device 306, and device control function providing module 402.

The device control function providing module 402 includes a profile information manipulation module 402a and device set information manipulation module 402b. The device control function providing module 402 has profile information expression means (not shown) that holds an XML file which expresses the contents of a profile (the specifications and setups of a device). This profile information is acquired from a device discovered in the discovery phase. The profile information manipulation module 402a reads out and manipulates the profile held in this profile information expression means.

When the device control application 401 requests a device list edited for each owner, the device set information manipulation module 402b searches for devices, creates a device list edited for each owner on the basis of a list of discovered devices, and returns it to the device control application 401. The device control application 401 displays the device list returned from the device set information manipulation module 402b on the display device 306.

The device control function providing module 402 further has device control means (not shown). When the device control application 401 requests to acquire status information of a specific device included in the displayed list, the device control means requests status information of that specific device, and receives status information from it.

The message transmission/reception module 407 includes a message transmission module 407a and message reception module 407b. The message transmission module 407a and message reception module 407b transmit/receive messages via the network interface 304.

When UPnP is used as a device control protocol, SSDP is used as a protocol in the discovery phase, and SOAP is used as a protocol in the control phase. Hence, different protocols are used depending on the phases. Therefore, the phase can be determined from the protocol. The device control protocol control module 403 issues an event by detecting a change in protocol from SSDP to SOAP. The phase determination module 404 determines a phase upon reception of the phase change event from the device control protocol control module 403.

The security application module 405 reads out a security policy corresponding to the phase determined by the phase determination module 404 from the security policy holding module 406, and applies it to the device control protocol control module 403. The device control protocol control module 403 controls the message transmission/reception module 407 to transmit/receive messages in accordance with the security policy applied by the security application module 405.

The device control protocol control module 403 serves as control means that discovers devices, and controls the discovered devices. The security application module 405 serves as application means that applies corresponding security policies (those which correspond to phases) when the device control protocol control module 403 as the control means discovers devices (discovery phase) and it controls the discovered devices (control phase).

Application modules of a device control apparatus (communication apparatus) which can support a plurality of device control protocols according to the fourth embodiment of the present invention will be described below using FIG. 6.

The device control apparatus (communication apparatus) which can support a plurality of device control protocols has a device control application 501, device control function providing module 502, virtual protocol processing module 503, device control protocol control module 504, phase determination module 505, device control protocol determination module 506, security application module 507, security policy holding module 508, and message transmission/reception module 509.

The device control application 501 controls data inputs/outputs among the external input device 308, display device 306, and device control function providing module 502.

The device control function providing module 502 includes a profile information manipulation module 502a and device set information manipulation module 502b. The device control function providing module 502 has profile information expression means (not shown) that holds an XML file which expresses the contents of a profile (the specifications and setups of a device). This profile information is acquired from a device discovered in the discovery phase. The profile information manipulation module 502a reads out and manipulates the profile held in this profile information expression means.

When the device control application 501 requests a device list edited for each owner, the device set information manipulation module 502b searches for devices, as described above, creates a device list edited for each owner on the basis of a list of discovered devices, and returns it to the device control application 501. The device control application 501 displays the device list returned from the device set information manipulation module 502b on the display device 306.

The device control function providing module 502 further has device control means (not shown). When the device control application 501 requests to acquire status information of a specific device included in the displayed list, the device control means requests status information of that specific device, and receives status information from the specific device.

The device control protocol control module 504 includes a protocol A processing module 504a, protocol B processing module 504b, and protocol C processing module 504c. Note that the device control protocol control module 504 holds three protocol processing modules in FIG. 6. However, the number of protocol processing modules is not limited to three, and is determined in accordance with the number of device control protocols that can be supported.

The message transmission/reception module 509 includes a message transmission module 509a and message reception module 509b. The message transmission module 509a and message reception module 509b transmit/receive messages via the network interface 304.

The virtual protocol processing module 503 determines which of device control protocols is to be actually used, and sends an event indicating that the device control protocol is determined to the device control protocol control module 504.

Upon reception of the event, the device control protocol control module 504 understands which of device control protocols is to be used. When UPnP is used as a device control protocol, the device control protocol control module 504 issues an event by detecting a change in protocol from SSDP to SOAP. The phase determination module 505 determines a phase upon reception of the phase change event from the device control protocol control module 504.

The security application module 507 reads out a security policy corresponding to the device control protocol determined by the device control protocol determination module 606 and the phase determined by the phase determination module 505 from the security policy holding module 508, and applies it to the device control protocol control module 504.

The protocol processing module (e.g., 504*a*) that processes the device control protocol to be used determined by the virtual protocol processing module 503 receives a device discovery command in that device control protocol from the virtual protocol processing module 503, and transmits that command from the message transmission module 509*a* using the security policy applied by the security application module 507.

The device control protocol control module 504 serves as control means that can support a plurality of device control protocols, and discovers devices and controls the discovered devices using these device control protocols. The security application module 507 serves as application means that applies corresponding security policies (those which correspond to the device control protocol and phases) in accordance with the device control protocol to be used when the device control protocol control module 504 as the control means discovers devices (discovery phase) and it controls the discovered devices (control phase).

Also, the device control protocol control module 504 serves as search means that searches for devices. The security application module 507 serves as application means which applies a security policy depending on whether a device search is conducted via broadcast communications like SSDP in UPnP or a device search is conducted using a database that provides a directory service like a search request to UDDI by SOAP.

Figure 7:
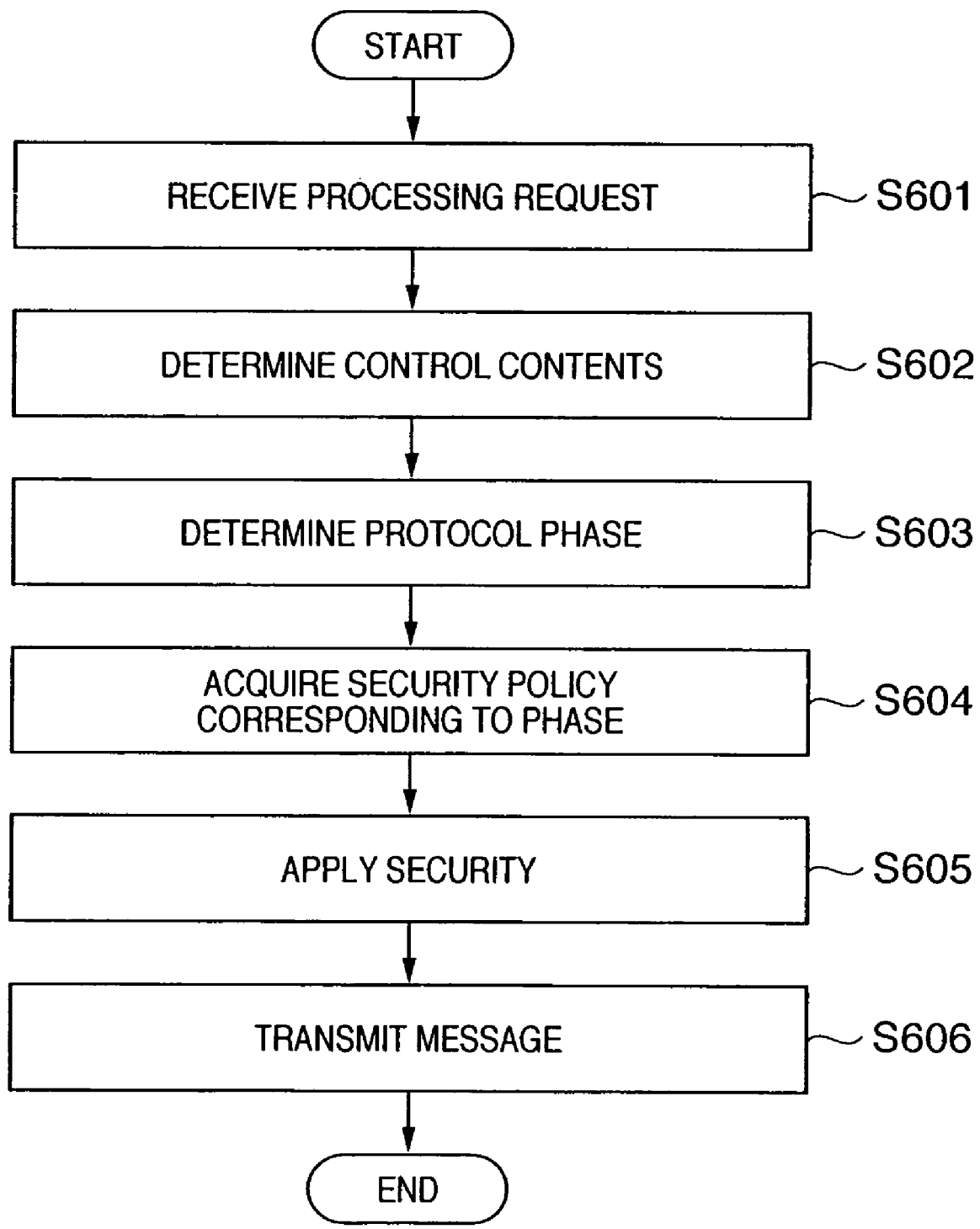
FIG. 7 is a flowchart showing the sequence of a security policy application process in the device control apparatus according to the third embodiment of the present invention.

FIG. 7 is a flowchart upon applying a security policy in the device control apparatus according to the third embodiment shown in FIG. 5. This flowchart corresponds to a part of the application programs stored in the storage device 309.

In step S601, the device control function providing module 402 receives a processing request from the device control application 401. The device control function providing module 402 determines processing contents and issues a command to the device control protocol control module 403 in step S602.

The phase determination module 404 checks in step S603 if the device control protocol control module 403 is currently executing the discovery phase or control phase. For example, in case of UPnP, since the discovery phase uses SSDP as a protocol and the control phase uses SOAP as a protocol, different protocols are used depending on the phases. Hence, the phase determination unit 404 determines the current phase based on the protocol.

In step S604, the security application module 406 acquires a security policy suited to the phase determined by the phase determination module 404 from the security policy holding module 406. For example, when the security policy holding module 406 holds security policy A for the discovery phase and security policy B for the control phase, the security application module 406 acquires one of security policies A and B from the security policy holding module 406 in accordance with the current phase in execution in step S604.

Security policy A is, e.g., as follows. That is, security policy is used in the discovery phase of UPnP. The protocol to be used is SSDP, and the type is broadcast. The encryption type is IPSec, the level is use, and the protocol uses AH (Authentication Header; an authentication header for user authentication). If the level is use, and IPSec can be used, a communication is made with IPSec; otherwise, a communication is made without IPSec.

Security policy B is, e.g., as follows. That is, security policy is used in the control phase of UPnP. The protocol to be used is SOAP, and the type is unicast. The encryption type is IPSec, the level is require, and the protocol uses AH (Authentication Header) and ESP (Encapsulating Security Payload: encryption of IP packets). If the level is require, and IPSec can be used, a communication is made with IPSec; otherwise, no communication is made. Security policy B has a higher security level than security policy A.

In step S605, the security application module 405 applies the security policy acquired from the security policy holding module 406 to the device control protocol control module 403.

In step S606, the message transmission module 407*a* transmits a message which is encrypted according to the security policy such as IPSec, SSL, or the like to the device to be controlled. Upon transmission of a message from the message transmission module 407*a*, Internet protocol (IP) is used. As the IP version, both IPv4 and IPv6 can be used. A medium actually used as the communication route is a wired or wireless medium. Note that communication protocols such as TCP, UDP, HTTP, SMTP, SNMP, FTP, and the like may also be used in accordance with the device control protocol.

According to the aforementioned embodiment, the security policies suited to the discovery and control phases of the device control protocol are set. For example, the security policy applied to the discovery phase can select devices to be discovered (only devices with matched security policies are discovered). Furthermore, the security policy applied to the control phase can further select devices (only devices with matched security policies can be controlled). Hence, more secure device control can be implemented.

That is, the security policies of the discovery and control phases are set in the security policy holding module 406 so that the security policy of the discovery phase is lower than that of the control phase (or not to apply any security).

For example, when the device control application 401 requests a device list edited for each owner (step S601), the device control function providing module 402 generates a device discovery command (step S602), and passes the generated command to the device control protocol control module 403. The phase of a communication to be made is detected in accordance with the device control protocol (step S603). In this case, since the discovery phase is detected, the security policy of the discovery phase is acquired from the security policy holding module 406 (step S604), and the acquired security policy is applied to this communication (step S605). Then, the discovery command is transmitted (step S606), and a response from each device that received this command is received.

In the discovery phase of UPnP as the device control protocol, if security policy A described above is to be applied, a communication is made with a device that can use IPSec using IPSec, and with a device which cannot use IPSec without using IPSec. Note that this security policy A uses AH (Authentication Header; an authentication header for user authentication) of IPSec.

In this manner, devices are discovered, and a device list edited for each owner is created based on a list of the discovered devices and is returned to the device control application 401. The device control application 401 displays the device list returned from the device control function providing module 402 on the display device 306.

Furthermore, when the device control application 401 requests to acquire status information of a specific device included in the displayed list (step S601), the device control function providing module 402 generates a command for acquiring status information of that specific device (step S602), and passes the generated command to the device control protocol control module 403. The phase of a communication to be made is detected in accordance with the device control protocol (step S603). In this case, since the control phase is detected in place of the discovery phase, the security policy of the control phase is acquired from the security policy holding module 406 (step S604), and the acquired security policy is applied to this communication (step S605). Then, the device status acquisition command is transmitted (step S606), and status information is received from the specific device.

In the control phase of UPnP as the device control protocol, if security policy B described above is to be applied and the specific device can use IPSec, a communication is made using IPSec; if the specific device cannot use IPSec, no communication is made. Note that this security policy B uses AH (Authentication Header; an authentication header for user authentication) and ESP (Encapsulating Security Payload: encryption of IP packets) of IPSec.

By applying various security policies in the discovery phase, device control apparatuses with matched security policies can discover each other, and a group based on the security policy of the discovery phase can be formed in the device control apparatus network.

Figure 6:
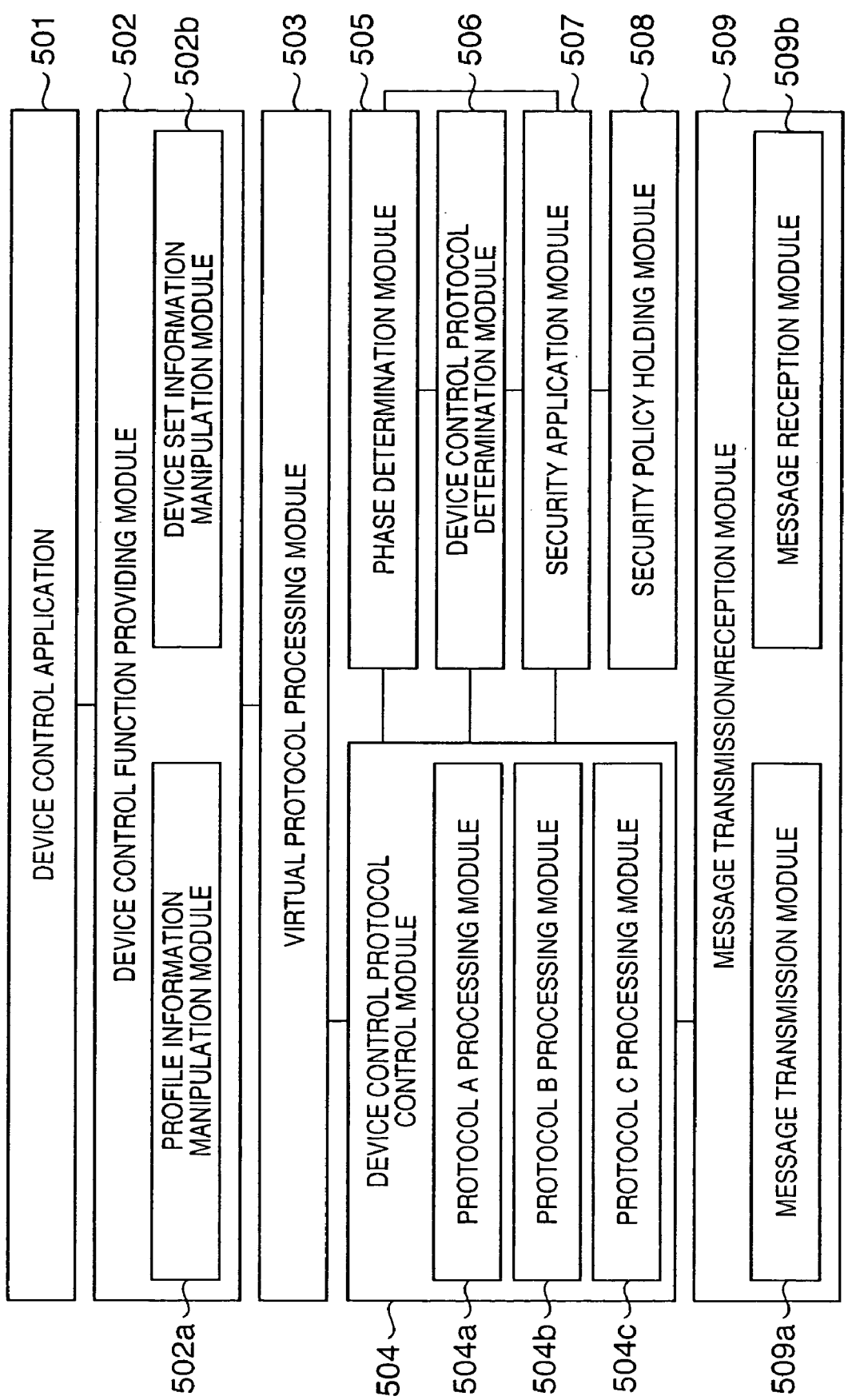
FIG. 6 is a diagram showing the module configuration of a device control apparatus which can support a plurality of device control protocols according to the fourth embodiment of the present invention.
Figure 8:
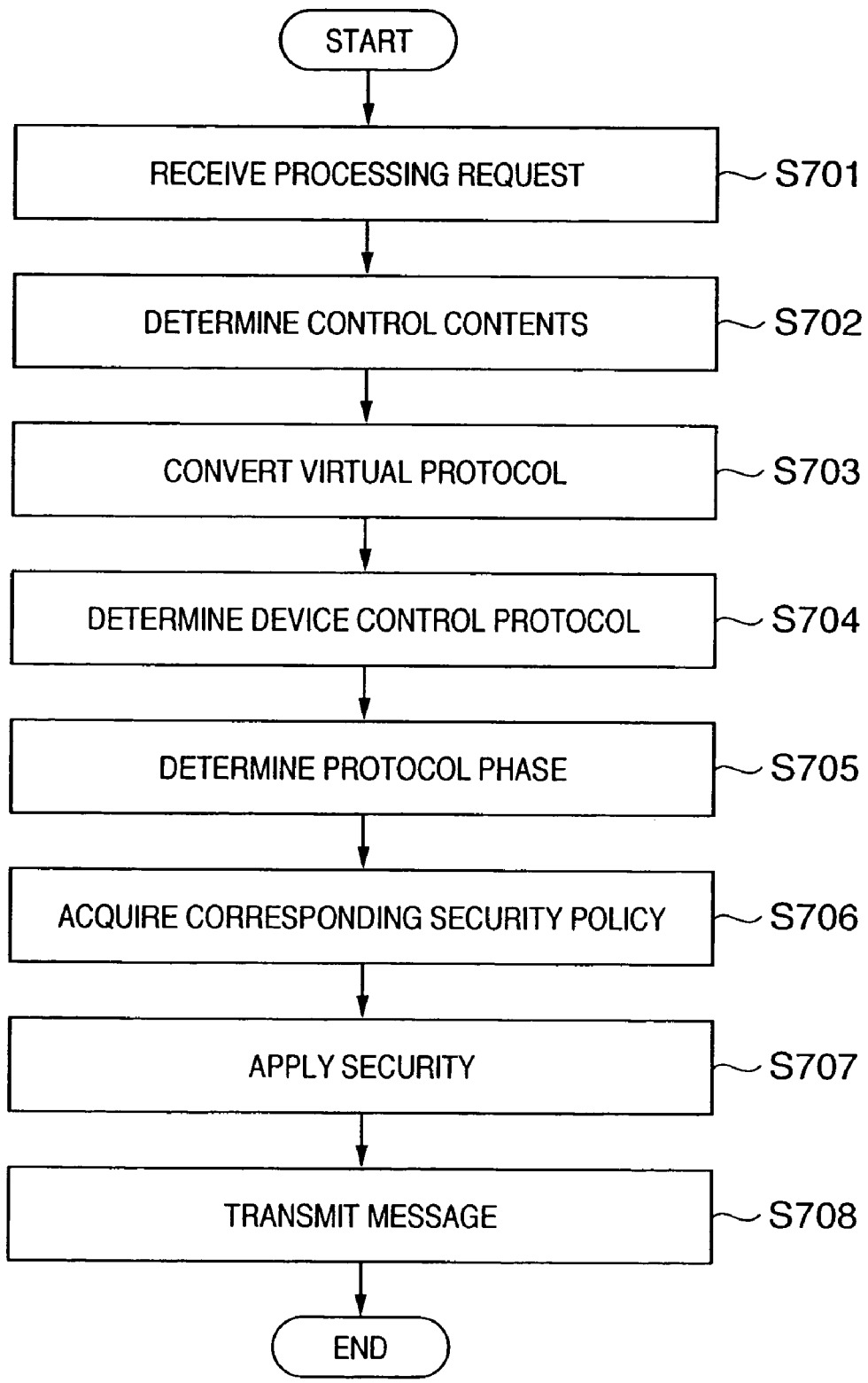
FIG. 8 is a flowchart showing the sequence of a security policy application process in the device control apparatus which can support a plurality of device control protocols according to the fourth embodiment of the present invention.

FIG. 8 is a flowchart upon applying a security policy in the device control apparatus which can support a plurality of device control protocols according to the fourth embodiment shown in FIG. 6. This flowchart corresponds to a part of the application programs stored in the storage device 309.

In step S701, the device control function providing module 502 receives a processing request from the device control application 501. The device control function providing module 502 determines processing contents in step S702.

In step S703, the virtual protocol processing module 503 executes protocol conversion from the virtual protocol that abstracts a plurality of device control protocols into a device control protocol to be actually used in accordance with the control contents determined in step S702, and issues a command to the device control protocol control module 504.

For example, when the device control application 501 requests a device list edited for each owner (step S701), the device control function providing module 502 generates a device discovery command (a command in the virtual protocol) (step S702), and passes the generated command to the virtual protocol processing module 503. Assume that devices are to be discovered using protocols A, B, and C in turn. The device control function providing module 502 notifies the virtual protocol processing module 503 of a device control protocol to be used. The virtual protocol processing module 503 converts the command received from the device control function providing module 502 into a command used in protocol A first, and passes it to the device control protocol control module 504 (after a device discovery process using protocol A is completed, device discovery processes using protocols B and C are executed in turn).

In step S704, the device control protocol determination module 506 determines the currently used device control protocol based on the command issued in step S703 by the device control protocol control module 504.

The phase determination module 505 checks in step S705 if the device control protocol control module 504 is currently executing the discovery phase or control phase. For example, if the device control protocol is UPnP, since the discovery phase uses SSDP as a protocol and the control phase uses SOAP as a protocol, different protocols are used depending on the phases. Hence, the phase determination unit 505 determines the current phase based on the protocol.

In step S706, the security application module 507 acquires a security policy suited to the current phase of the currently used device control protocol from the security policy holding module 508 on the basis of the determination results in steps S704 and S705.

If the currently used device control protocol is UPnP, security policy A or B is acquired from the security policy holding module 508 in accordance with the current phase, as in step S604 in FIG. 7.

On the other hand, if the currently used device control protocol is Web service, one of security policies C and D is acquired from the security policy holding module 508 in accordance with the current phase.

Security policy C is, e.g., as follows. That is, security policy is used in the discovery phase of Web service. The protocol to be used is SOAP (access to UDDI (database used to search for Web service)), and the type is unicast. The encryption type is IPSec, the level is "require", and the protocol uses AH (Authentication Header). If the level is "require" and IPSec can be used, a communication is made with IPSec; otherwise, no communication is made.

Security policy D is, e.g., as follows. That is, security policy is used in the control phase of Web service. The protocol to be used is SOAP (access to a device to be controlled), and the type is unicast. The encryption type is IPSec, the level is "require", and the protocol uses AH (Authentication Header) and ESP (Encapsulating Security Payload: encryption of IP packets). If the level is "require", and IPSec can be used, a communication is made with IPSec; otherwise, no communication is made.

On the other hand, if the currently used device control protocol is Jini (Java(R) Intelligent network infrastructure), one of security policies E and F is acquired from the security policy holding module 508 in accordance with the current phase.

Security policy E is, e.g., as follows. That is, security policy is used in the discovery phase of Jini. The protocol to be used is RMI (Remote Method Invocation; access to Lookup service (which registers functions provided by devices connected to a network, and is used to search for devices with desired functions)), and the type is broadcast or unicast. The encryption type is IPSec, the level is "use", and the protocol uses AH (Authentication Header) and ESP (Encapsulating Security Payload: encryption of IP packets). If the level is "use" and IPSec can be used, a communication is made with IPSec; otherwise, a communication is made without IPSec.

Security policy F is, e.g., as follows. That is, security policy is used in the control phase of Jini. The protocol to be used is RMI (access to a device to be controlled), and the type is unicast. The encryption type is IPSec, the level is "require" and the protocol uses AH (Authentication Header) and ESP (Encapsulating Security Payload: encryption of IP packets). If the level is "require", and IPSec can be used, a communication is made with IPSec; otherwise, no communication is made.

When the apparatus is configured to be able to support a plurality of device control protocols like in this embodiment, different security levels are applied in accordance with not only the phases of a device control protocol but also each device control protocol. For example, a search process that searches for neighboring controllable devices by broadcast communications like in the discovery phase of UPnP and a search process that searches for controllable devices using a directory service like UDDI (Universal Description Discovery and Integration (database used to search Web service)) have different features of data to be transmitted/received and different transmission methods. Hence, different security levels are applied to these processes (a lower security level is applied to a search process by broadcast communications).

In step S707, the security application module 507 applies the security policy acquired from the security policy holding module 508 to the device control protocol control module 504.

In step S708, the message transmission module 509a transmits a message which is encrypted according to the security policy such as IPSec, SSL, or the like to the device to be controlled. Upon transmission of a message from the message transmission module 509a, Internet protocol (IP) is used. As the IP version, both IPv4 and IPv6 can be used. A medium actually used as the communication route is a wired or wireless medium. Note that communication protocols such as TCP, UDP, HTTP, SMTP, SNMP, FTP, and the like may also be used in accordance with the device control protocol.

According to the aforementioned embodiment, in the device control apparatus which is configured to be able to support a plurality of device control protocols, security policies suited to the discovery and control phases of each device control protocol supported by the device control apparatus are set. For example, a security policy which is applied to the discovery phase of each device control protocol selects devices to be discovered (only devices with matched security policies are discovered). Furthermore, a security policy applied to the control phase can further select devices (only devices with matched security policies can be controlled). Hence, more secure device control can be implemented.

That is, the security policies of the discovery and control phases of each of a plurality of device control protocols are set in the security policy holding module 508 so that the security policy of the discovery phase is lower than that of the control phase (or not to apply any security).

For example, when the device control application 501 requests a device list edited for each owner (step S701), the device control function providing module 502 generates a device discovery command (a command in the virtual protocol) (step S702), and passes the generated command to the virtual protocol processing module 503. Assume that devices are to be discovered using protocols A, B, and C in turn. The device control function providing module 502 notifies the virtual protocol processing module 503 of a device control protocol to be used. The virtual protocol processing module 503 converts the command received from the device control function providing module 502 into a command used in protocol A first (S703), and passes it to the device control protocol control module 504 (after a device discovery process using protocol A is completed, device discovery processes using protocols B and C are executed in turn).

In this case, a device control protocol to be used and a phase in the device control protocol to be used are detected. In this case, since the device control protocol is protocol A (step S704) and the phase is the discovery phase (step S705), a security policy of the discovery phase of protocol A is acquired from the security policy holding module 508 (step S706), and the acquired security policy is applied to this communication (step S707). Then, the discovery command is transmitted (step S708), and a response from each device that received this command is received.

In the discovery phase of UPnP as the device control protocol, if security policy A described above is to be applied, a communication is made with a device that can use IPSec using IPSec, and with a device which cannot use IPSec without using IPSec. Note that this security policy A uses AH (Authentication Header; an authentication header for user authentication) of IPSec.

In this manner, devices are discovered, and a device list edited for each owner is created based on a list of the discovered devices and is returned to the device control application 501. The device control application 501 displays the device list returned from the device control function providing module 502 on the display device 306.

Furthermore, when the device control application 501 requests to acquire status information of a specific device included in the displayed list (step S701), the device control function providing module 502 generates a command for acquiring status information of that specific device (step S702), and passes the generated command to the virtual protocol processing module 503. The device control function providing module 502 notifies the virtual protocol processing module 503 of a device control protocol to be used. In this case, the device control protocol used when this specific device is discovered is used. That is, when the device which is discovered using UPnP as the device control protocol is to be controlled, UPnP is used (SSDP is used in the discovery phase of UPnP, and SOAP is used in the control phase). The virtual protocol processing module 503 passes a SOAP command for acquiring status information of the specific device to the device control protocol control module 504.

The device control protocol is checked (step S704; e.g., UPnP), and the control phase is detected in place of the discovery phase in this case (step S705). Hence, a security policy of the control phase of that device control protocol is acquired from the security policy holding module 508 (step S706), and the acquired security policy is applied to this communication (step S707). Then, the device status acquisition command is transmitted (step S708), and status information is received from the specific device.

In the control phase of UPnP as the device control protocol, if security policy B described above is to be applied and the specific device can use IPSec, a communication is made using IPSec; if the specific device cannot use IPSec, no communication is made. Note that this security policy B uses AH (Authentication Header; an authentication header for user authentication) and ESP (Encapsulating Security Payload: encryption of IP packets) of IPSec.

By applying various security policies in the discovery phase of each device control protocol, device control apparatuses with matched security policies can discover each other, and a group based on the security policy of the discovery phase can be formed in the device control apparatus network.

A device control apparatus (communication apparatus) according to the fifth embodiment of the present invention will be described below. In this embodiment, the apparatus is configured to access external resources such as a Web server and the like using different IP (Internet Protocol) addresses and different security levels for respective applications, and uses IPSec for security and temporary addresses as IP addresses. Furthermore, since a communication with security (including privacy protection, encryption, and authentication) is made based on an application, secure access control can be implemented for respective applications.

The IEEE EUI-64 format will be explained first.

Note that details of the IPv6 address generation method are described in RFC 2373.

A typical IPv6 address includes prefix and interface ID data: prefix data is assigned to the upper 64 bits, and interface ID data is assigned to the lower 64 bits.

For example, the interface ID data of the IEEE EUI-64 format is generated based on the MAC address (48 bits) of an Ethernet(R) interface (NETIF 704 in FIG. 2).

T. Narten, R. Draves, Privacy Extensions for Stateless Address Autoconfiguration in IPv6, RFC 3041 describes temporary addresses as a problem and measure of concerning addresses in the IEEE EUI-64 format.

A temporary address is created using the MD5 message digest. MD5 is a function that inputs 128 bits and outputs 128 bits.

The input 128 bits have the following configuration by the upper and lower 64 bits. That is, the current interface ID data is set in the upper 64 bits. A random 64-bit value generated by an arbitrary method or the lower 64 bits of the previous computation result of MD5 are set in the lower 64 bits of the input 128 bits. The MD5 message digest is computed using these 128 bits as an input, and the upper 64 bits of the 128-bit computation result are extracted. Sixty-four bits in which the seventh bit from the left of the extracted 64 bits is set to be zero are set as the next interface ID. The lower 64 bits of the computation result are recorded since they are used in the next MD5 computation.

According to the aforementioned generation method, different interface IDs are generated at given intervals, and are used as global addresses. In such case, unlike use of addresses generated in the IEEE EUI-64 format, it is difficult to determine whether or not nodes used in communications are an identical one, thus preventing invasion of privacy.

An encryption algorithm and encryption key actually used in IPSec communications are manually set in advance, or are dynamically determined and exchanged in negotiations with a communication partner, which are made immediately before the beginning of communications. As a result of a series of negotiations, a consensus about the encryption algorithm and encryption key obtained between each others is called SA (Security Association; to be abbreviated as SA hereinafter).

Simultaneously with settlement of this SA, a 32-bit integer value called an SPI (Security Pointer Index) associated with the SA is assigned. The SPI is inserted in each packet in encrypted communications, and serves as a guide indicating the encryption algorithm used to encrypt the communication contents of a packet and the encryption key to be used.

Upon completion of negotiations, a communication starts between parties concerned using encrypted packets. In this stage, the aforementioned SPI value is fixed, and an encrypted communication is then made using the SPI as each other's "password". In IPSec, encryption is made for respective packets, and packets are packed in a container called ESP (Encapsulating Security Payload; to be abbreviated as ESP hereinafter) upon transmission. The ESP has a structure in which three pieces of additional information, i.e., the SPI, a sequence number field, and authentication data, are appended to the encrypted communication contents.

An AH (Authentication Header; to be abbreviated as AH hereinafter) is a mechanism for "assurance of integrity" and "authentication". In the AH, no data encryption is made, and only the SPI, sequence number, and authentication data are packed and appended into a normal IP packet.

Various security levels can be set by combining the types of encryption algorithms, the ESP, and the AH.

Modules in a computer system according to the fifth embodiment will be explained below with reference to FIG. 9. Security control of a computer system 600 is implemented by a security control module 800 in FIG. 9.

The security control module 800 includes an IP address manager 801, security policy manager 802, application manager 803, security controller 804, and encryptor 805. The IP address manager 801, security policy manager 802, and application manager 803 are assured on the RAM 302 (FIG. 4). The security controller 804 is implemented by software of the CPU 301 (FIG. 4). The encryptor 805 is implemented by software of the CPU 301 or a combination of software of the CPU 301 and hardware (not shown).

The IP address manager 801 is a table, which is assured on the RAM 302, and is used to manage the aforementioned IPv6 temporary addresses and applications of a computer system, which use these addresses in communications. The IP address manager 801 has a function that allows search, read/write, add, and delete so as to uniquely specify the IP address and application.

The security policy manager 802 is a table, which is assured on the RAM 302 and is used to manage the security levels used by the applications of the computer system, the types of encryption algorithms, and security policies such as AH, ESP, and the like, corresponding to the security levels. The security policy manager 803 has a function that allows search, read/write, add, and delete so as to uniquely specify the security level and security policy.

The application manager 803 is a table, which is assured on the RAM 302, and is used to manage the applications of the computer system and the corresponding security levels. The application manager 803 has a function that allows search, read/write, add, and delete so as to uniquely specify the application and security level.

The security controller 804 acquires information of the IP address manager 801, security policy manager 802, and application manager 803, and uses a security policy and temporary address corresponding to a given application in a communication of that application. That is, the security controller 804 has a function of controlling a communication of a given application of the computer system upon running of that application, and making setups and instructions required for IPSec in the encryptor 805 (to be described later). Also, the security controller 804 has a function of generating an IPv6 temporary address by the aforementioned method. Furthermore, the security controller 804 has a function of updating the information of the IP address manager 801. The security controller 804 is implemented by software of the CPU 01.

The encryptor 805 has a function of making negotiations with a communication partner (e.g., determination of an encryption algorithm and encryption key, and the like), and also a function of making setups, encryption, and decryption required to apply IPSec to communication data (communication packets) of the network interface 304 (FIG. 4). The encryptor 805 is implemented by software of the CPU 301 or a combination of software of the CPU 301 and hardware (not shown).

Figure 9:
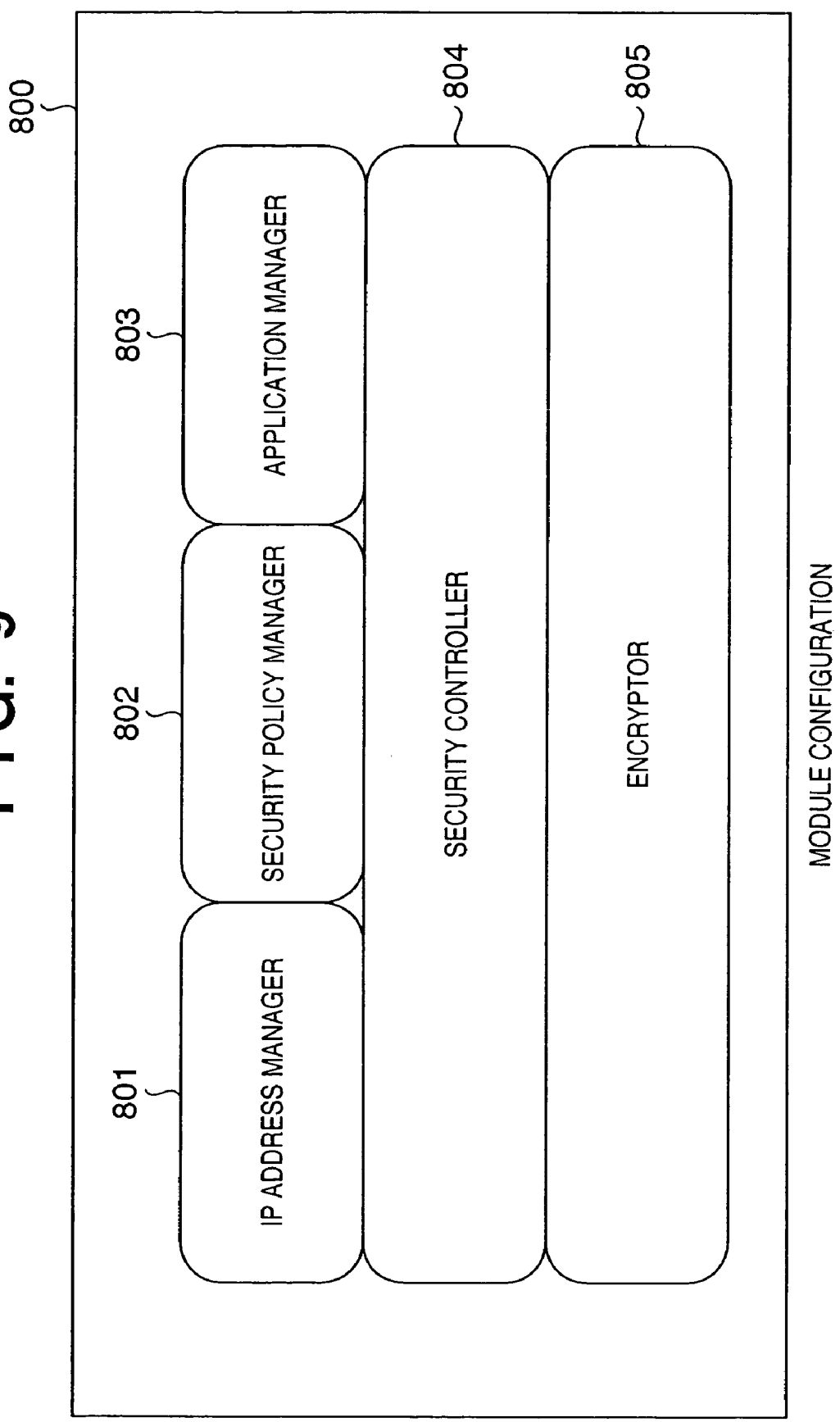
FIG. 9 is a diagram showing the system module configuration according to the fifth embodiment of the present invention.

FIG. 10 is a conceptual view of the IP address manager 801 in FIG. 9 of this embodiment. The IP address manager 801 has two fields, i.e., an address field 901 and application field 902. The IP address manager 801 is assured on the RAM 302, allows to search, read/write, add, and delete the contents of these fields, and uniquely specifies an item in the application field 902 with respect to that of the address field 901.

The address field 901 stores IPv6 temporary addresses.

The application field 902 stores application names used in the computer system. If a given application name is not stored in the application item 902, it indicates that a corresponding IP address is not used by an application.

FIG. 11 is a conceptual view of the security policy manager 802 in FIG. 9 of this embodiment.

The security policy manager 802 includes a security level field 1001 and security parameter field 1002. The security policy manager 802 is assured on the RAM 302, allows to search, read/write, add, and delete the contents of these fields, and uniquely specifies an item in the security parameter field 1002 with respect to that of the security level field 1001.

The security level field 1001 stores numerical values indicating security levels.

The security parameter field 1002 stores parameters (those for encryption and authentication) required for IPSec. The setting values of the parameters are listed in correspondence with items of the security level field 1001. For example, when AH:IN is stored at security level 0, this means that AH (Authentication Header) is applied to IPSec in the setups on the receiving side. On the other hand, when AH:ESP:INOUT is stored at security level 6, this means that AH and ESP (Encapsulating Security Payload) are applied to IPSec in the setups on the transmitting and receiving sides.

Figure 12:
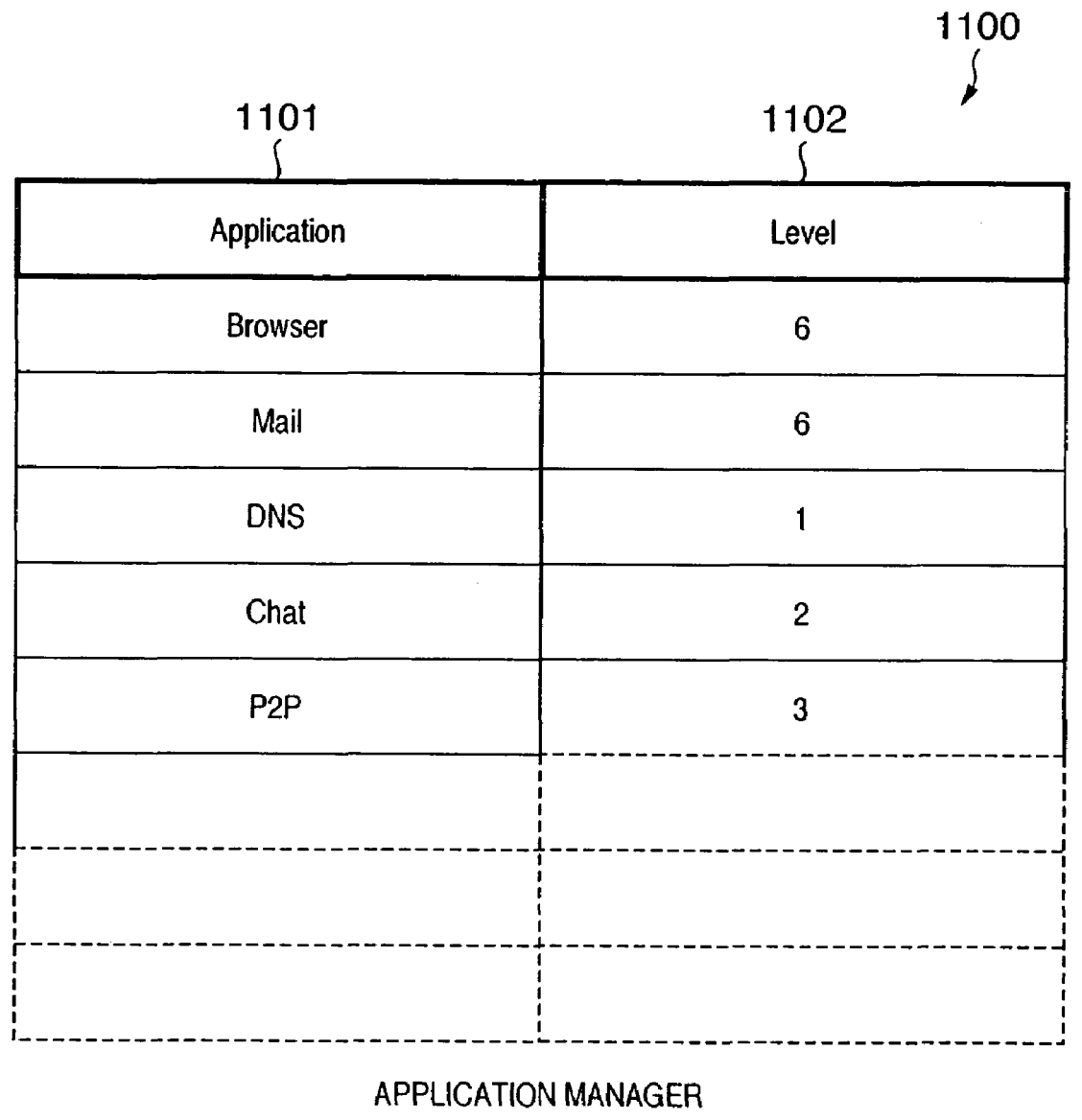

FIG. 12 is a conceptual view of the application manager 803 in FIG. 9 of this embodiment. The application manager 803 includes two fields, i.e., an application field 1101 and security field 1102. The application manager 803 is assured on the RAM 302, allows to search, read/write, add, and delete the contents of these fields, and uniquely specifies an item in the security field 1102 with respect to that of the application field 1101.

The application field 1101 stores application names used in the computer system of this embodiment, to which IPSec is to be applied.

The security field 1102 stores security levels, which indicate the same values as those of the items of the security level field 1001 of the security policy manager 802. An application in the application field 1101 has a security level indicated by the value stored in the security field 1102.

The flow of the overall process in the system of this embodiment will be described below.

The following setup process is executed in advance.

In the computer system of this embodiment, security levels and corresponding IPSec parameters are set in the security policy manager 801 on the RAM 302. Furthermore, applications which are used in the computer system to access external network resources, and corresponding security levels are set in the application manager 803 on the RAM 302.

IPv6 temporary addresses are generated using the MD5 message digest, as described above, and are stored in the address field 901 of the IP address manager 801.

Figure 13:
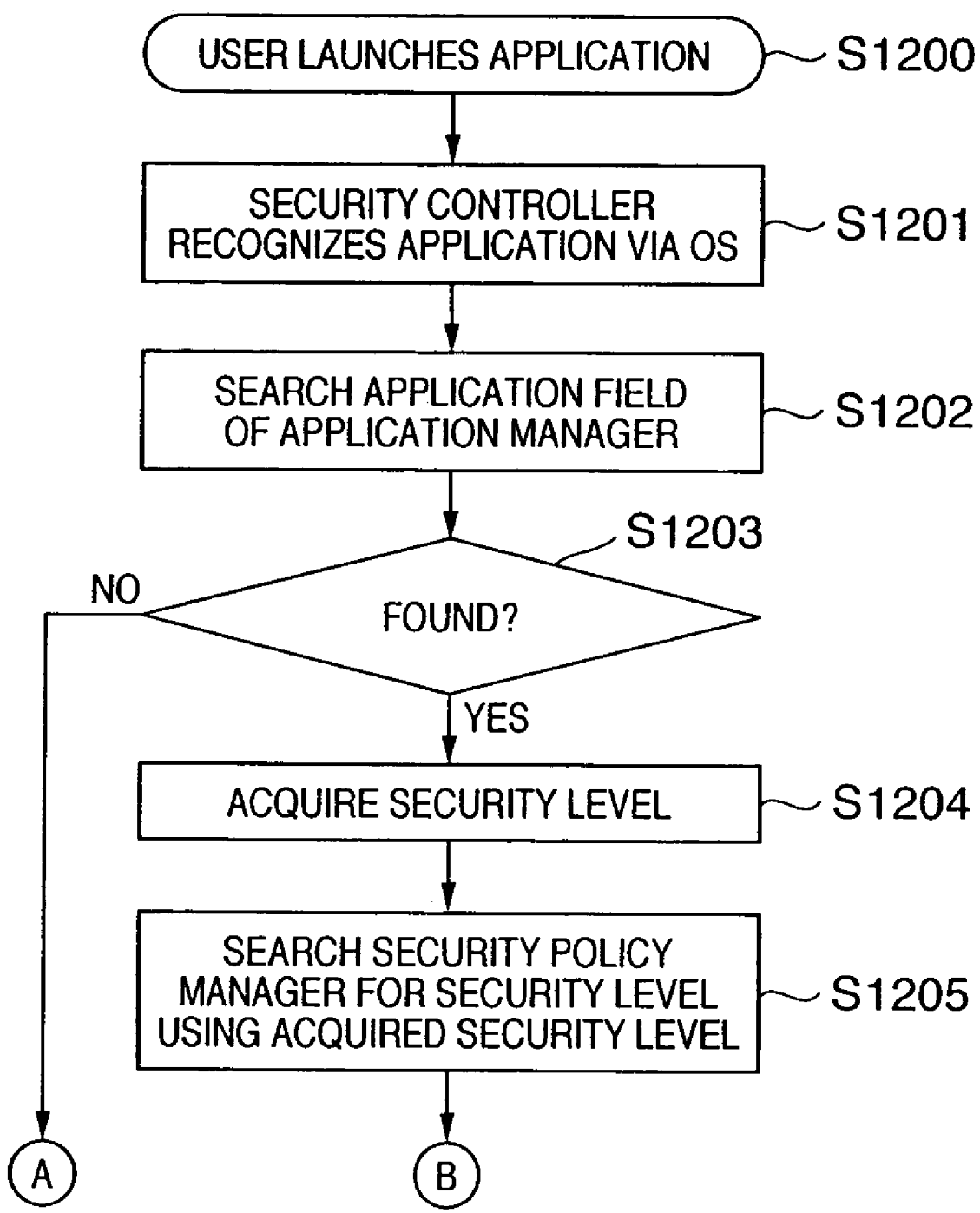
FIG. 13 is a flowchart of a system process according to the fifth embodiment of the present invention.
Figure 14:
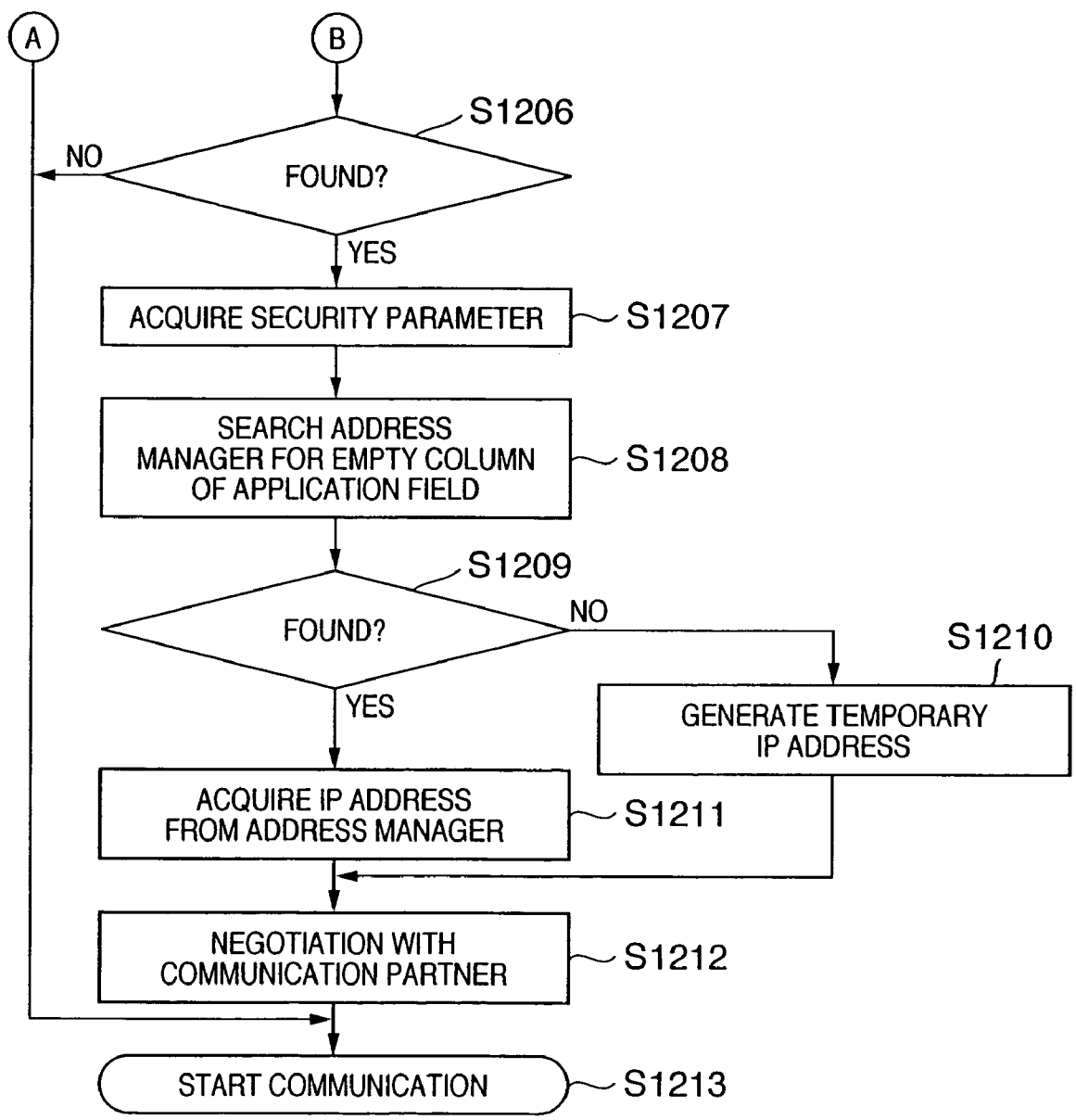
FIG. 14 is a flowchart of a system process according to the fifth embodiment of the present invention.

The flow of the processing in the computer system of this embodiment will be described below using the system processing flowcharts shown in FIGS. 13 and 14. These flowcharts correspond to some parts of the application program stored in the HDD 309.

The user who uses the computer system of this embodiment launches a desired application (an application used to access external resources) (S1200).

In step S1201, the security controller 804 recognizes the application launched in the previous step from the OS (Operation System) of the computer system.

In step S1202, the security controller 804 searches the application field 1101 of the application manager 803 using the application name acquired and recognized in the previous step. If an identical application name is found as a result of the search, the flow advances to step S1204; otherwise, it is recognized that the application is not an object to which IPSec is to be applied (S1203).

If the identical application name is found in step S1203, the security controller 804 acquires and holds a value in the security level field 1102 corresponding to that item of the application field 1101 in step S1204.

The security controller 804 searches the security level field 1001 of the security policy manager 802 using the acquired and held security level value (S1205).

If an identical security level is found as a result of the search, the flow advances to step S1207; otherwise, it is recognized that the application is not an object to which IPSec is to be applied (S1206).

If the identical security level is found in step S1206, a security parameter (parameter for encryption and authentication (IPSec)) is acquired and held from the security parameter field 1002 corresponding to that security level in step 1207.

In step S1208, the address manager 801 is searched for empty columns of the application field 902.

If it is determined in step S1209 as a result of the search that the application field 902 includes empty columns, the flow advances to step S1211; otherwise, the flow advances to step S1210.

If it is determined in step S1209 that the application field 902 has no empty columns, the aforementioned temporary address is generated, and the flow advances to step S1212.

If it is determined in step S1209 that the application field 902 includes empty columns, the application name is inserted into one of these columns, and a corresponding IP address is acquired from the address field 901 in step S1211.

In step S1212, the security controller 804 makes setups required for the OS using the security parameter acquired and held in step S1207 (i.e., it sets a security policy in accordance with the application used to access external resources). Immediately before the application launched in the previous step transmits/receives data, required negotiations are made with a communication partner. In the negotiations, the security parameter acquired in step S1207 is used. In the negotiations in step S1212, the IP address generated in step S1210 or that acquired from the address manager 801 in step S1211 is used (a temporary address is set as an address of the access source that accesses external resources).

In step S1213, data with a communication partner undergoes authentication and encryption processes, i.e., IPSec, thus establishing a communication by the above application.

In the above embodiment, IP addresses are set for respective applications. However, in modification 1, IP addresses are set for respective sessions. On the other hand, in modification 2, IP addresses are set for respective connection destinations. Furthermore, in modification 3, IP addresses are set for respective windows when a plurality of browser windows are opened.

FIG. 15 is a conceptual view of an example in which IPSec is executed for each application in the system of this embodiment. This example will be described below using FIG. 15.

For example, assume that the user searches for a specific partner, and communicates with that partner.

Upon searching for a specific partner, a so-called server such as DNS (Directory Name Service; to be abbreviated as DNS hereinafter), Active Directory, and the like is searched, or an advertisement such as P2P (Peer to Peer; to be abbreviated as P2P hereinafter) or the like is searched. In these cases, corresponding protocols are required, and communications must be made using suited security policies. That is, there are some protocols used to search for a communication partner. In step S1202, a protocol to be executed to search for a communication partner is recognized, and a security policy is set in correspondence with the recognized protocol (S1212). Also, a temporary address used in the protocol used to search for a communication partner is set (S1210 or S1211).

For example, when DNS is used, security secrecy is not so high, and a communication is made at security level 1. That is, when the security level upon using DNS is level 1 and AH:IN is stored at security level 1, the computer system 600 of this embodiment applies AH to IPSec in the setups on the receiving side. Then, the computer system accesses a DNS server 1301 to inquire it of an address of a specific partner 1302. In another embodiment, when DNS is used, no security is applied (security is applied in a communication with the specific partner).

When the specific partner 1302 is discovered in the first phase, and a communication that requires a high security level is to be made with that partner 1302 using a browser in the second phase, the computer system 600 makes a communication at security level 6. That is, when the security level upon making a communication with a specific partner using the browser is level 6, and AH:ESP:INOUT is stored at security level 6, AH and ESP are applied to IPSec in the setups on the transmitting and receiving sides.

The computer system 600 uses temporary addresses set in step S1210 or S1211 as the address of the access source when it accesses the DNS server 1301 in the first phase and when it communicates with the specific partner 1302 in the second phase. Also, the computer system 600 uses different source addresses when it transmits a message to the DNS server 1301, and when it transmits a message to the partner 1302 at the address acquired from the DNS server 1301. When a message is received from the DNS server 1301 and when a message is received from the partner 1302 at the address acquired from the DNS server 1301, if the destination address of the message is the destination address used upon transmitting the message to the DNS server 1301 or that used upon transmitting the message to the partner 1302, that message is received as a message addressed to itself.

As described above, when the user of the computer system 600 communicates with a communication partner, e.g., when the user accesses the DNS using the browser in the first phase, a reliable DNS server is guaranteed. When the user exchanges data with a desired resource or communication partner in the second phase, an IPv6 address which is hardly misused in invasion of privacy is used, and data encrypted by ESP are exchanged in channels.

An IPv6 address that includes the interface ID generated in the IEEE EUI-64 format is never used, and communication data which is not encrypted is never exchanged with that communication partner.

Therefore, for example, even when the user of the computer system 600 is not familiar with a computer, he or she can communicate with a communication partner while privacy protection and encryption are applied without any user's complicated setups.

Furthermore, since the address generated by a specific method and the encryption/authentication function (IPSec) are combined, encryption and authentication of communication data are done while making it difficult to determine whether or not computer systems used in communications are an identical one, and preventing invasion of privacy. Hence, appropriate, flexible access control can be implemented without any user's recognition.

In addition, even when only the interface ID in the IEEE EUI-64 format is used due to user's inadvertent operation or the failure of the computer 600, control is made to inhibit any communications with a communication partner in such case. Hence, invasion of privacy and information leakage due to failures can also be prevented.

Furthermore, even when the user of the computer system 600 is familiar with a computer and causes invasion of privacy and information leakage on purpose, they can be prevented.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priorities from Japanese Patent Application Nos. 2003-330059 and 2003-330060 filed on Sep. 22, 2003, which are hereby incorporated by reference herein.

What is claimed is:

1. A communication apparatus comprising programmable hardware operable as:

communication means for executing a first communication phase for discovering a device using first communications, and for executing a second communication phase using second communications with the device discovered by executing the first communication phase;

determination means for determining, in accordance with a first communication protocol used by the communication means, whether a communication is to be made in the first communication phase, and for determining, in accordance with a second communication protocol used by the communication means, whether the communication is to be made in the second communication phase; and application means for applying a first security policy to the communication means in the first communication phase using the first communication protocol, if the determination means determines that the communication is to be made in the first communication phase, and for applying a second security policy to the communication means in the second communication phase using the second communication protocol, if the determination means determines that the communication is to be made in the second communication phase, wherein said application means includes allowing means for allowing said communication means to execute the first communication in the first communication phase without a security protocol, if the security protocol is unable to be used, and prohibiting means for prohibiting said communication means from executing the second communication in the second communication phase without the security protocol, if the security protocol is unable to be used.

2. A communication method comprising the steps of:

executing a first communication phase for discovering a device using first communications;

executing a second communication phase using second communications with the device discovered by the first communication phase;

determining, in accordance with a first communication protocol used by the communication means, whether a communication is to be made in the first communication phase;

determining, in accordance with a second communication protocol used by the communication means, whether the communication is to be made in the second communication phase;

applying a first security policy to communication means in the first communication phase using the first communication protocol, if it is determined that the communication is to be made in the first communication phase; and applying a second security policy to the communication means in the second communication phase using the second communication protocol, if it is determined that the communication is to be made in the second communication phase, wherein said applying of the first security policy includes executing the first communication in the first communication phase without a security protocol, if the security protocol is unable to be used, and said applying of the second security policy includes prohibiting execution of the second communication in the second communication phase without the security protocol, if the security protocol is unable to be used.

3. A computer-readable storage medium storing a program for causing a computer to apply a security policy, the program comprising:

a communication module for executing a first communication phase for discovering a device, and for executing a second communication phase using second communications with the device discovered by the first communication phase;

a determination module for determining, in accordance with a first communication protocol used by the communication module, whether a communication is to be made in the first communication phase, and for determining, in accordance with a second communication protocol used by the communication module, whether the communication is to be made in the second communication phase; and an application module for applying a first security policy to the communication module in the first communication phase using the first communication protocol, if it is determined that the communication is to be made in the first communication phase, and applying a second security policy to the communication module in the second communication phase using the second communication protocol, if it is determined that the communication is to be made in the second communication phases wherein said application module includes an allowing module for allowing said communication module to execute the first communication in the first communication phase without a security protocol, if the security protocol is unable to be used, and a prohibiting module for prohibiting said communication module from executing the second communication in the second communication phase without the security protocol, if the security protocol is unable to be used.

4. The apparatus according to claim 1, wherein said application means comprises setting means for setting a security level of the second security policy to be higher than that of the first security policy.

5. The apparatus according to claim 1, wherein said communication means comprises control means for controlling the device by the second communication.

6. The apparatus according to claim 1, wherein said application means comprises generating means for generating a first temporary address for the first communication, and for generating a second temporary address for the second communication.

7. The method according to claim 2, wherein said applying step comprises a setting step of setting a security level of the second security policy to be higher than that of the first security policy.

8. The method according to claim 2, wherein said second communication executing step comprises a control step of controlling the device by the second communication.

9. The method according to claim 2, wherein said first security policy applying step comprises a first generating step of generating a first temporary address for the first communication, and said second security policy applying step comprises a second generating step of generating a second temporary address for the second communication.

10. The computer-readable storage medium according to claim 3, wherein said application module comprises a setting module for setting a security level of the second security policy to be higher than that of the first security policy.

11. The computer-readable storage medium according to claim 3, wherein said communication module comprises a control module for controlling the device by the second communication.

12. The computer-readable storage medium according to claim 3, wherein said application module comprises a generating module for generating a first temporary address for the first communication, and for generating a second temporary address for the second communication.

13. A communication apparatus comprising:

a communication unit that executes a first communication phase for discovering a device, and that executes a second communication phase with the device discovered by the first communication phase; and a processor that determines, in accordance with a first communication protocol used by the communication unit, whether a communication is to be made in the first communication phase, and that determines, in accordance with a second communication protocol used by the communication unit, whether the communication is to be made in the second communication phase, wherein the processor applies a first security policy to the communication unit in the first communication phase using the first communication protocol, if the processor determines that the communication is to be made in the first communication phase, and applies a second security policy to the communication unit in the second communication phase using the second communication protocol, if the processor determines that the communication is to be made in the second communication phase, and wherein said processor allows said communication unit to execute the first communication in the first communication phase without a security protocol, if the security protocol is unable to be used, and prohibits said communication unit from executing the second communication in the second communication phase without the security protocol, if the security protocol is unable to be used.

14. The apparatus according to claim 13, wherein said processor sets a security level of the second security policy to be higher than that of the first security policy.

15. The apparatus according to claim 13, wherein said processor controls the device by the second communication.

16. The apparatus according to claim 13, wherein said processor generates a first temporary address for the first communication, and generates a second temporary address for the second communication.

* * * * *